3,078,785
COFFEE PERCOLATOR
Aquilino C. Antonelli, 92 Erie St., Providence, R.I.
Filed Feb. 23, 1960, Ser. No. 10,228
1 Claim. (Cl. 99—310)

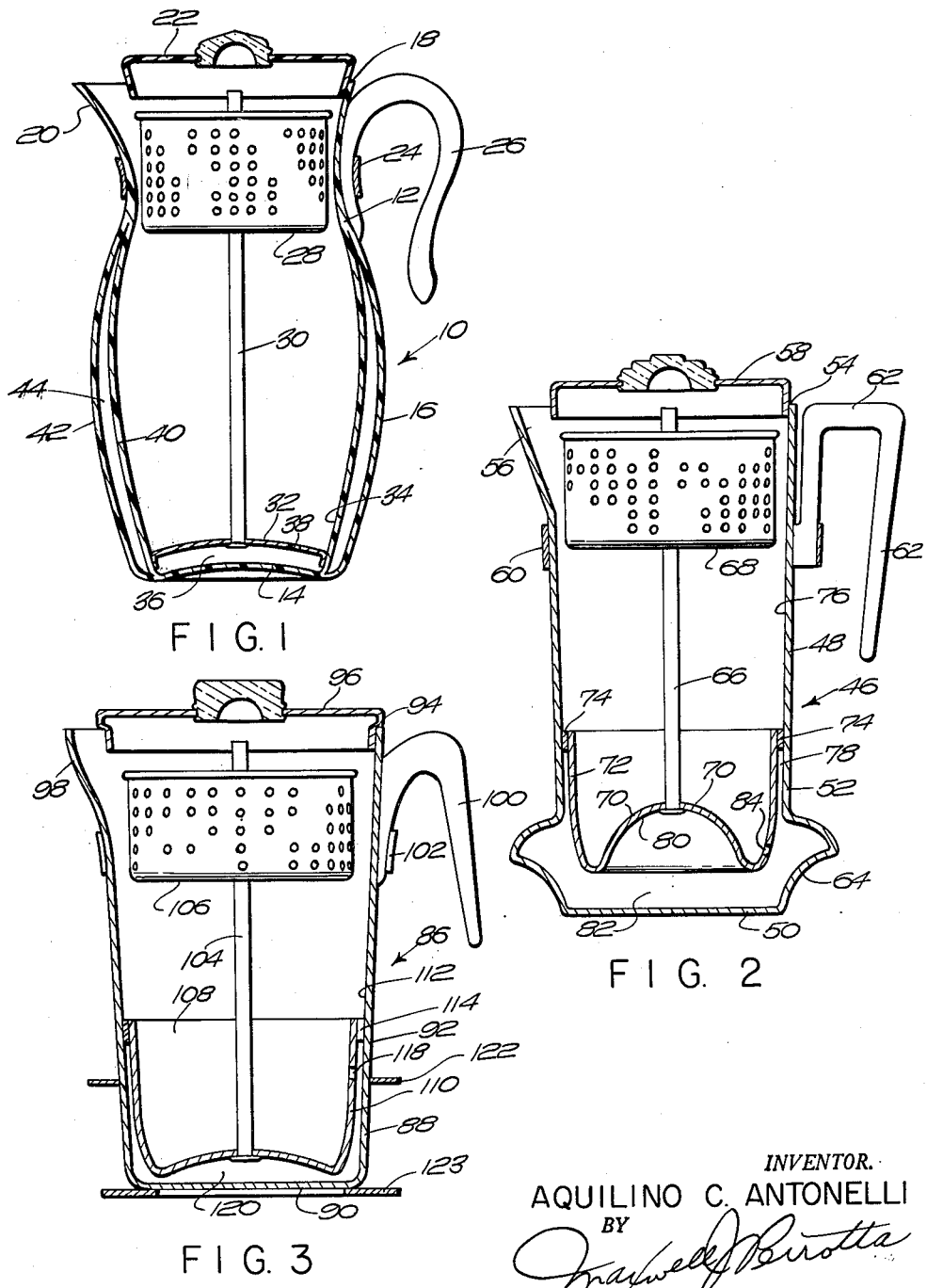

The present invention relates to improvements in coffee percolators and the like.

An object of the present invention is to provide an improved coffee percolator in which the boiling and percolating action is initiated faster than was possible heretofore.

Another object of the present invention is to provide an improved coffee percolator in which the heat applied to the percolator shell is efficiently distributed and utilized with excessive heat deflected away to inhibit unnecessary boiling action.

A further object of the present invention is to provide an improved coffee percolator wherein excessive heat applied to the shell side wall adjacent the bottom is insulated from the liquid contents of the shell.

Still another object of the present invention is to provide an improved coffee percolator wherein the base support for the coffee-receiving cup-shaped member provides a liquid flow restricting means for limiting the rate of return of the liquid as it is percolating so as to limit the volume of liquid in the bottom heat chamber provided thereby.

A still further object of the present invention is to provide an improved coffee percolator wherein the shell and the base support therein define a bottom heat chamber and an annular insulating chamber adjacent the bottom.

Still another object of the present invention is to provide an improved coffee percolator wherein the shell thereof has a double side wall providing insulation and a single heat-receiving bottom wall.

Various other objects and advantages will become apparent from the detailed descriptions to follow.

In the drawings:

FIGURE 1 is a vertical sectional view through a first embodiment of coffee percolator;

FIGURE 2 is a vertical sectional view through a second embodiment; and

FIGURE 3 is a vertical sectional view through still another embodiment.

Referring more particularly to FIGURE 1 of the drawings wherein like numerals apply to like parts throughout, it will be seen that I have provided a coffee percolator 10 including a shell 12 with a bottom wall 14 and side wall 16 providing an opening at the top 18. The shell is formed with a pour spout portion 20 at the open top. A removable cover 22 is received in the open top as is conventional. Also, the shell 12 has a ring at 24 to which the handle 26 is secured in any desired conventional fashion.

As in prior type coffee percolators, there is a cup-shaped coffee-receiving member 28 received in the shell. For support of the cup-shaped member and for other reasons as will presently appear, a hollow stem 30 is engaged axially therethrough. The stem 30 is secured at its lower end to the base 32. The base 32 is of inverted dish shape with a downturned annular portion of a diameter sufficient to be engaged against the shell inside surface 34 above the bottom 14 so as to define a heat chamber 36. The base 32 has a small return aperture or opening 38 therein of preselected size so as to restrict the return flow of liquid to the heat chamber 36.

The shell is of hollow double wall construction including inner and outer walls 40 and 42 provided insulating space at 44 which can be a vacuum or contain suitable insulation material. Preferably, the shell is made of a plastic sold under the trademark Pyrosaran.

In operation, the percolater 10 is placed over heat and the liquid in the chamber 36 rapidly comes to a boil when heat is applied to the bottom wall 14 and percolates up the stem and down through the coffee in the cup-shaped member 28 and back to the main body of liquid in the shell. A restricted flow occurs back through the return port 38 to the heat chamber 36. The hollow insulating walls 42, 44 prevent the application of excessive heat to the main body of liquid therein to inhibit unnecessary boiling action to brew better tasting coffee.

FIGURE 2 shows a percolator 46 especially useful over a gas flame. The percolator 46 has a shell 48 which can be made of a suitable plastic, glass or metal, as desired. The open top is formed with a pour spout portion 56 and receives a suitable cover 58 therein. The ring 60 and handle 62 may be of conventional construction fastened in any desired fashion to the shell 48. The side wall 52 is formed adjacent the bottom wall 50 with an annular flame-deflecting formation 64.

Inside, the stem 66 carries the usual cup-shaped coffee-receiving member 68 and has a unique base 70 attached to its lower end. The base 70 has an annular portion 72 provided with a rim or ring 74 which is closely engageable against the tapering inside surface 76 of the shell 48 for support thereby. The annular portion 72 extends downwardly in closely spaced relation to the surface 76 so as to provide a narrow annular space at 78 for a purpose to be described. The remaining central portion 80 of the base is of inverted dish-shape supported over the bottom wall 50 to define a heat chamber at 82. The base is formed with a restricted return port at 84.

In use, the percolator 46 is placed over heat, preferably a gas flame, and again the heat chamber 82 functions to initiate early boiling and percolation. Percolation draws liquid from the annular space 78 which produces a liquid-free space adjacent the rim 74. The liquid passes up the stem 66 and through the coffee in the usual fashion and then returns to the main body of liquid in the shell. Flow back through the base 70 to the heat chamber 82 is restricted by the port 84 and the close fit at the rim 74. The liquid-free space at 78 provides insulation from any heat applied to the shell above the bottom wall so that undesired boiling is obviated.

In FIGURE 3, the coffee percolator 86 has a shell 88 of preselected material, such as a selected glass or metal, including a bottom wall 90 and a tapered side wall 92 integral with the periphery of the bottom wall and extending to an open top at 94. A suitable cover is provided at 96 and the top of the shell is formed with a pour spout portion 98. The shell has a handle 100 and an attachment ring at 102 for the handle.

The hollow stem 104 and cup-shaped coffee-receiving member 106 are as in the previous embodiments. The base 108 is similar to the base 70 of FIGURE 2. Base 108 includes a tapering annular portion 110 which conforms to the interior surface 112 of the shell but is spaced slightly therefrom by the rim or ring 114 which supports the base. The base thereby defines with the shell a thin annular space 118 and a heat chamber 120 at the bottom.

The exterior of the shell 88 is fitted with a flat deflector ring 122 which preferably is metal and either integral with or removably mounted on the shell. The ring 122 functions as a flame deflector to divert the heat of the flame from producing undesirable boiling action at the upper side walls of the shell. Thus, the heat is effectively utilized and concentrated at the heat chamber to promptly and efficiently initiate percolation. A further flame deflector is provided at 123 which function to deflect flame at the periphery of the bottom wall. The deflector 123 is separate from the shell. The base has the restricted return port 124, or ports if desired, so that a liquid free insulating space is formed in the annular chamber 118.

In view of the foregoing it is believed that I have provided improved embodiments of coffee percolators which fulfill the objects hereinbefore enumerated.

As this invention may be embodied in several forms without departing from the spirit or essential characteristics thereof, the present embodiment is therefore illustrative and not restrictive, since the scope of the invention is defined by the appended claim rather than by the description preceding it, and all changes that fall within the metes and bounds of the claim or that form its functional as well as conjointly cooperative equivalents, are therefore intended to be embraced by the claim.

I claim:

A coffee percolator comprising a shell having a heat receiving bottom wall, a side wall joined to the bottom wall around its periphery and having a top opening and pour spout portion, a hollow stem, a cup-shaped coffee ground receiving member carried on said stem at its upper end, a cup-shaped base connected to said stem at its lower end for supporting the same in spaced relation to the bottom portion of the shell, said base being provided with a side wall engaging sealing ring around its outer periphery at its upper edge, said ring frictionally engaging said side wall to support said base above said bottom to define a steam chamber below said base, the annular portion of said base adjoining said ring being in spaced relation to said side wall and extending downwardly parallel to said side wall and spaced therefrom to define an insulating space between the side wall and the base above said stem chamber, and an aperture in said base of pre-selected size restricting the return flow of liquid in the percolating cycle.

References Cited in the file of this patent

UNITED STATES PATENTS

| | | |
|---|---|---|
| 956,481 | Chapman | Apr. 26, 1910 |
| 1,036,767 | Wojidkow | Aug. 27, 1912 |
| 1,167,775 | Miller | Jan. 11, 1916 |
| 1,794,641 | Payson et al. | Mar. 3, 1931 |
| 2,768,573 | Titus | Oct. 30, 1956 |
| 2,796,823 | Solmon | June 25, 1957 |

FOREIGN PATENTS

| | | |
|---|---|---|
| 23,002 | Switzerland | Jan. 8, 1901 |
| 13,171 of 1908 | Great Britain | Dec. 17, 1908 |